United States Patent [19]
Adachi et al.

[11] Patent Number: 6,039,675
[45] Date of Patent: Mar. 21, 2000

[54] SLIP CONTROL SYSTEM FOR TORQUE CONVERTER

[75] Inventors: Kazutaka Adachi, Yokohama; Akira Watanabe, Kanagawa, both of Japan

[73] Assignee: Nissan Motor Co., Ltd., Yokohama, Japan

[21] Appl. No.: 09/156,663

[22] Filed: Sep. 18, 1998

[30] Foreign Application Priority Data

Sep. 19, 1997 [JP] Japan .................................. 9-254989

[51] Int. Cl.$^7$ .................................................. F16H 61/14
[52] U.S. Cl. ........................... 477/174; 477/169; 477/175
[58] Field of Search .................................. 477/166, 169, 477/174, 175

[56] References Cited

U.S. PATENT DOCUMENTS

| 5,616,099 | 4/1997 | Sakai | 477/174 X |
| 5,626,536 | 5/1997 | Lpmp et al. | 477/181 |
| 5,637,052 | 6/1997 | Hirota et al. | 477/181 X |
| 5,683,329 | 11/1997 | Kono et al. | 477/176 |
| 5,697,479 | 12/1997 | Kono et al. | 477/169 X |
| 5,724,866 | 3/1998 | Minowa et al. | 475/214 X |
| 5,733,223 | 3/1998 | Matsubara et al. | 477/175 |
| 5,803,868 | 9/1998 | Kono et al. | 477/174 X |

OTHER PUBLICATIONS

K. Kono, et al., Scientific Lecture Meeting (Reprint No. 954), "Lock–up Clutch Slip Control System for Automatic Transmissions", pp. 81–84, Toyota Motor Corporation, (Sep. 1995).

*Primary Examiner*—Khoi Q. Ta
*Attorney, Agent, or Firm*—Foley & Lardner

[57] ABSTRACT

A slip control system for a torque converter with a lockup clutch comprises a controller from which a slip control signal is outputted to a slip control actuator of the torque converter. The controller is arranged to calculate a reference value of a lockup clutch engagement pressure on the basis of a characteristic of the torque converter, to calculate a difference canceling lockup clutch engagement pressure for adjusting an actual slip rotation speed to the target slip rotation speed, to obtain the sum of the lockup clutch engagement pressure reference value and the difference canceling lockup clutch engagement pressure as a lockup clutch engagement pressure command value, and to output the control signal indicative of the lockup clutch engagement pressure command value to the actuator.

11 Claims, 10 Drawing Sheets

TIME(SEC)

SLIP CONTROL SYSTEM FOR TORQUE CONVERTER

BACKGROUND OF THE INVENTION

The present invention relates to improvements in a slip control system of a torque converter for an automatic transmission, and more particularly to a slip control system which quickly converges a slip rotation speed between input and output elements of a torque converter to a target value according to a vehicle running condition.

Generally, a torque converter has merits such as a torque fluctuation absorbing function and a torque increasing function due to a fluid power transmission, although a transmission efficiency of the fluid power transmission is lower than that of a power transmission by means of a direct mechanical connection. In order to improve the transmission efficiency of the torque converter, most torque converters employ lockup clutches for directly connecting the input and output elements of the torque converter when the vehicle is put in a running condition where the torque fluctuation absorbing function or the torque increasing function are not required. However, such a torque converter with a lockup clutch, which is merely controlled between the lockup state (ON) and the converter state (OFF), has a limitation in a slip control range, and therefore it is difficult to further improve the transmission efficiency of a torque converter with this ON-OFF control type lockup clutch.

In order to solve the above-mentioned problems of the conventional ON-OFF lockup control type torque converter, various types of lockup torque converters have been proposed. For example, there has been proposed a lockup torque converter which is arranged to set a slip control range upon ensuring the necessary and minimum torque fluctuation absorbing function and torque increasing function. Further, an art for controlling slippage of a torque converter according to a target slip rotation speed determined by a vehicle running condition is disclosed in a paper "Luck-up Clutch Slip Control System for Automatic Transmissions", which is written on pages 81 to 84 in a preprint for a scientific lecture meeting No. 954 in 1995-9 published by a corporation of Japanese Society of Automotive Engineering. More particularly, in this art a target slip rotation speed is obtained from the throttle opening, a vehicle speed, and an oil temperature of the automatic transmission as an input. A lockup clutch engagement pressure command value (required engagement force) for achieving the target slip rotation speed is directly obtained by means of the parameter identification method where the target slip rotation speed and an actual slip rotation speed are treated as an input and an output, in order to output a control signal corresponding to the engagement pressure command value.

SUMMARY OF THE INVENTION

However, this conventional slip control system does not take account of the characteristic between the slip rotation speed and the lockup clutch engagement pressure command value including the engine output torque. Therefore, as shown in FIGS. 10A to 10E, when a throttle opening TVO of an engine is decreased from 20° to 10° at a vehicle speed of 45 k/m where the target slip rotation speed is kept at 110 rpm, the change of the lockup clutch engagement pressure command value $P_{LUC}$ will delay as compared with the decrease of the engine output torque. Therefore, the actual lockup clutch engagement pressure will be kept high, and the actual slip rotation speed $\omega_{SLPR}$ will become extremely small as compared with the target slip rotation speed $\omega_{SLPT}$ such that the lockup clutch tends to be put in an engaged state. In such a state, the slip rotation speed of the torque converter will be temporally short and generate shocks and noises.

It is therefore an object of the present invention to provide an improved slip control system which solves the above-mentioned problem.

A slip control system according to the present invention is for a torque converter with a lockup clutch. The slip control system controls a slip rotation speed between input and output elements of the torque converter at a target slip rotation speed by controlling an engagement pressure of the lockup clutch. The input element is connected to an engine to receive an engine output torque. The slip control system comprises a reference value calculating section, a difference canceling lockup clutch engagement pressure calculating section and a lockup clutch engagement pressure command value calculating section. The reference value calculating section calculates a reference value of the lockup clutch engagement pressure on the basis of an estimated engine output torque, the target slip rotation speed, and a characteristic of the torque converter. The difference canceling lockup clutch engagement pressure calculating section calculates a difference canceling lockup clutch engagement pressure for adjusting an actual slip rotation speed with the target slip rotation speed. The lockup clutch engagement pressure command value calculating section obtains the sum of the lockup clutch engagement pressure reference value and the difference canceling lockup clutch engagement pressure as the lockup clutch engagement pressure command value and outputs a signal indicative of the lockup clutch engagement pressure command value.

DETAILED DESCRIPTION OF THE INVENTION

Referring to FIGS. 1 to 9E, there is shown an embodiment of a slip control system for a torque converter 2 in accordance with the present invention.

Figure 1:
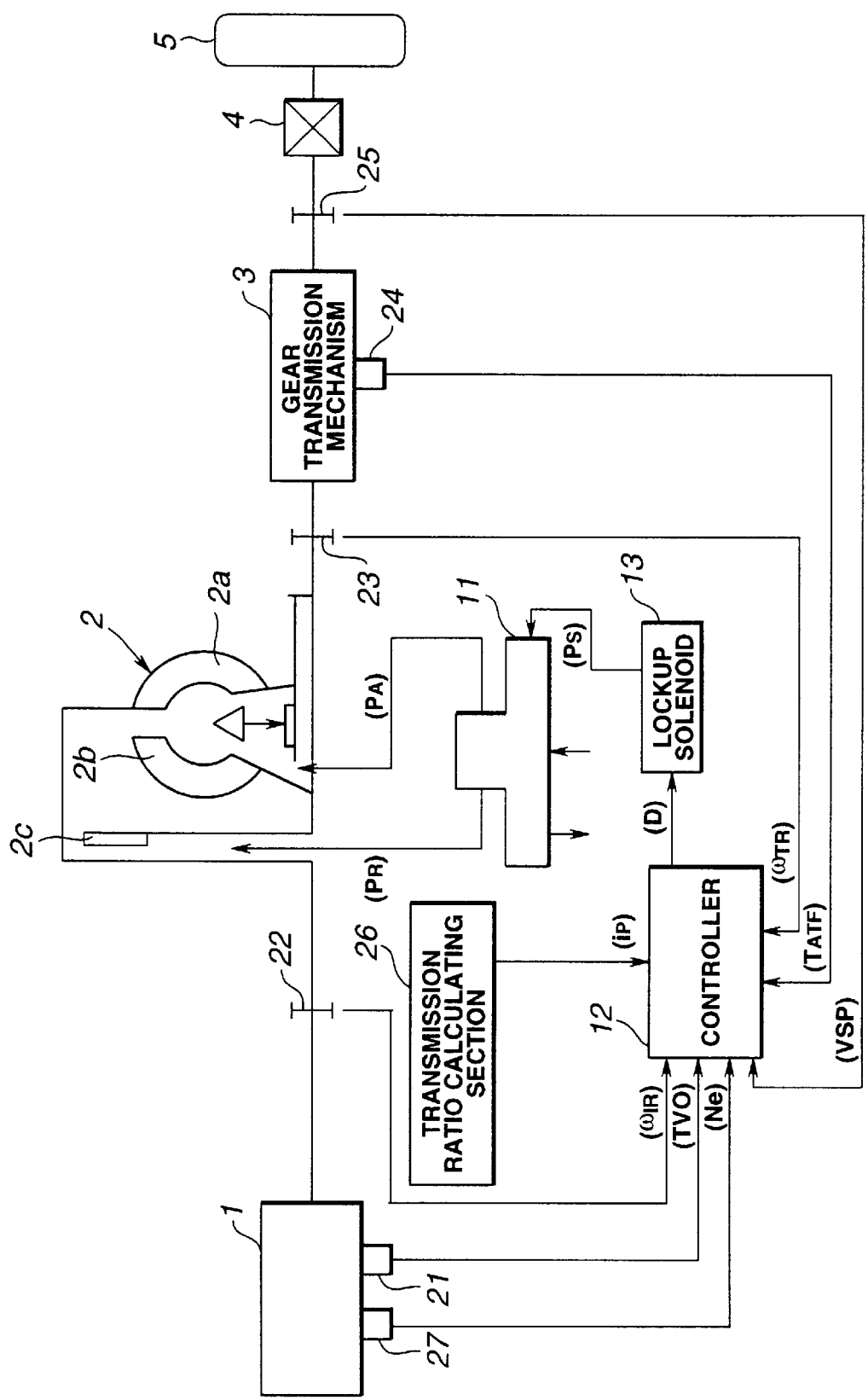
FIG. 1 is a schematic view of a drive system of a vehicle provided with a slip control system of an embodiment according to the present invention.

FIG. 1 shows a drive system which includes the torque converter 2 equipped with the slip control system according to the present invention. The drive system for a vehicle is constituted by an engine 1, the torque converter 2, a gear transmission mechanism 3 of an automatic transmission, a differential gear unit 4 and wheels 5 which are connected in order of mention, as shown in FIG. 1.

The torque converter 2 is of a lockup type and comprises a pump impeller 2a functioning as an input element driven by the engine 1, a turbine runner 2b functioning as an output element connected to an input shaft of the gear transmission mechanism 3, and a lockup clutch 2c directly connecting the pump impeller 2a and the turbine runner 2b.

An engagement force of the lockup clutch 2c is determined by a difference (lockup clutch engagement pressure) between an apply pressure $P_A$ and a release pressure $P_R$. When the apply pressure $P_A$ is smaller than the release pressure $P_R$, the lockup clutch 2c is put in a released condition so as not to directly connect the pump impeller 2a and the turbine runner 2b. That is, under this pressure balance, the torque converter 2 is put in a converter state where the slip between the pump impeller 2a and the turbine runner 2b is not limited. When the apply pressure $P_A$ is greater than the release pressure $P_R$ and when the difference therebetween is smaller than a predetermined value, the lockup clutch 2c is slippingly engaged according to the difference such that the torque converter 2 is operated in a slip control state where the slip speed of the torque converter 2 is controlled according to the engagement force of the lockup clutch 2b. When the difference is greater than the predetermined value, the torque converter 2 is put in a lockup state where a relative rotation between the pump impeller 2a and the turbine runner 2b becomes zero.

Therefore, when the torque converter 2 is put in the slip control state, the torque converter 2 transfers torque corresponding to the sum of a converter torque $t_{CNV}$ and a lockup clutch engagement capacity $t_{LU}$. The converter torque is a fluid transmission caused by the relative rotation between the pump impeller 2a and the turbine runner 2b through fluid, and the lockup clutch engagement is a mechanical transmission by means of the lockup clutch 2c. The sum of the converter torque $t_{CNV}$ and the lockup clutch engagement capacity $t_{LU}$ equals to the engine output torque $t_{EH}$.

Consequently, it becomes possible to obtain the lockup clutch engagement capacity $t_{LU}$ from the relationship between the lockup clutch engagement capacity $t_{LU}$ and the engine output torque $t_{EH}$ by subtracting the converter torque $t_{CNV}$ from the engine output torque $t_{EH}$.

Figure 2:
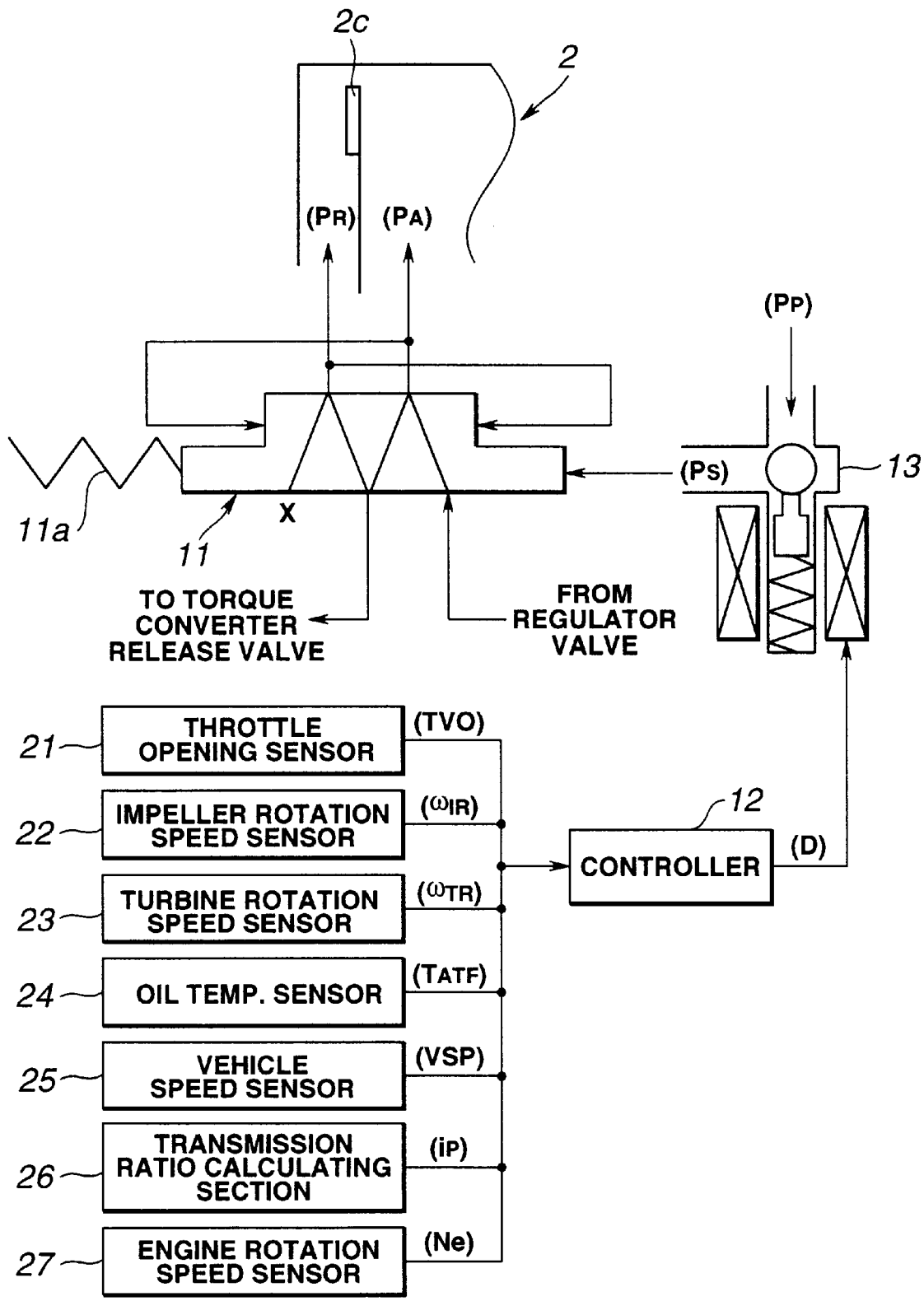
FIG. 2 is a schematic view of a slip control system of a torque converter of FIG. 1.

In the embodiment according to the present invention, in order to execute an aimed predetermined slip control, the slip control system for determining the apply pressure $P_A$ and the release pressure $P_R$ is arranged as follows:

As shown in FIG. 2, a slip control valve 11 is arranged to determine the apply pressure $P_A$ and the release pressure $P_R$ according to a signal pressure $P_S$ from a lockup solenoid 13 duty-controlled by a controller 12. The ship control valve 11 and the lockup solenoid 13 are respectively of conventional type. That is, the lockup solenoid 13 is arranged to increase the signal pressure $P_S$ according to the increase of the solenoid drive duty D applied from the controller 12 to employ a pilot pressure $P_P$ as a base pressure.

Figure 3:
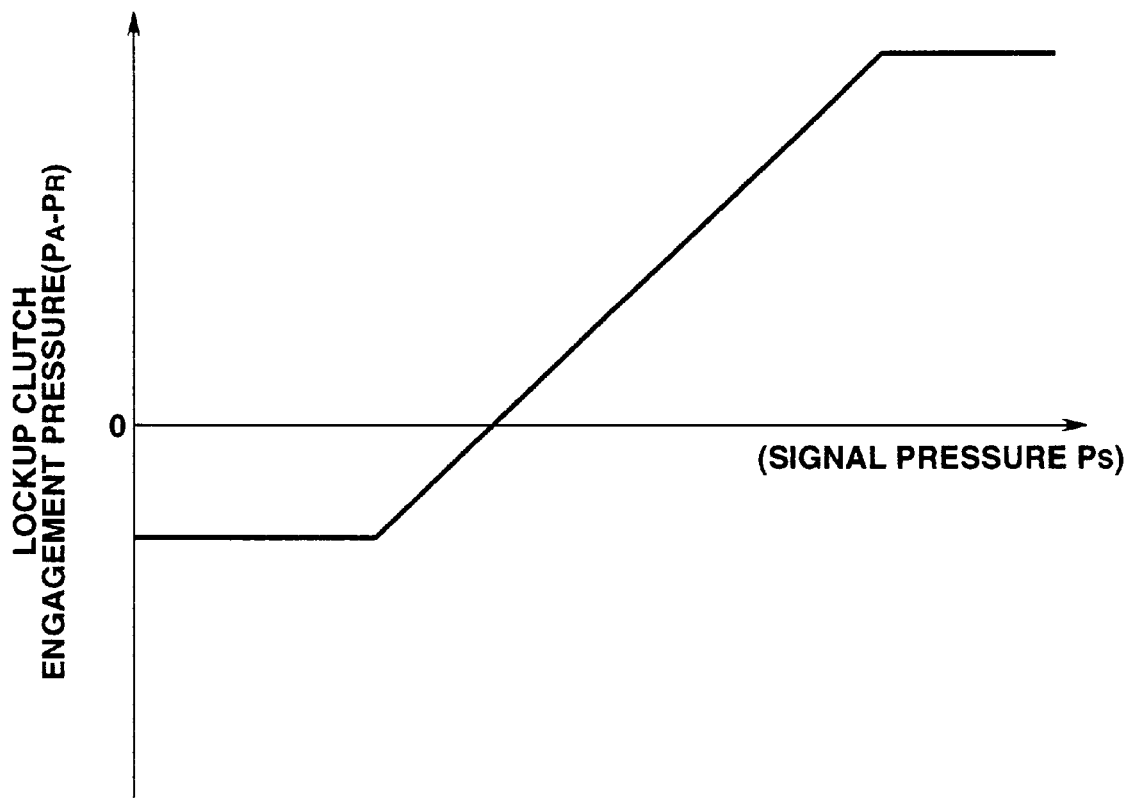
FIG. 3 is a graph which shows a relationship between a signal pressure outputted from a lockup solenoid and a lockup clutch engagement pressure.

The slip control valve 11 receives the signal pressure $P_S$ and the feedback release pressure $P_R$ in the same direction and receives a spring force of a spring 11a and the feedback apply pressure $P_A$ in an opposite direction opposite to the direction of the signal pressure $P_S$. The lockup clutch engagement pressure represented by a difference $(P_A-P_R)$ between the apply pressure $P_A$ and the release pressure $P_R$ is changed according to the change of the signal pressure $P_S$ as shown in FIG. 3.

When the lockup clutch engagement pressure $(P_A-P_R)$ takes a negative value, that is, when $P_R>P_A$, the torque converter 2 is put in a converter state. When the lockup clutch engagement pressure $(P_A-P_R)$ takes a positive value, that is, when $P_A<P_R$, the engagement capacity of the lockup clutch 2c is increased according to the increase of the positive value $(P_A-P_R)$ so as to increase the limiting of the slip rotation of the torque converter 2. Then, when the lockup clutch engagement pressure becomes greater than a predetermined value, the torque lo converter 2 is put in the lockup state.

As shown in FIGS. 1 and 2, the controller 12 receives a plurality of signals, such as a signal from a throttle opening sensor 21 for detecting a throttle opening TVO of the engine, a signal $\omega_{IR}$ from an impeller rotation speed sensor 22 for detecting a rotation speed $\omega_I$ of the pump impeller 2a, a signal $\omega_{TR}$ from a turbine rotation speed sensor 23 for detecting a rotation speed $\omega_T$ of the turbine runner 2b, a signal from an oil temperature sensor 24 for detecting a working oil temperature $T_{ATF}$ of an automatic transmission, a calculation result from a transmission ration calculating section 26 for calculating a transmission ratio $i_P$ and a signal from an engine rotation speed sensor 27 for detecting an engine rotation speed Ne.

Figure 4:
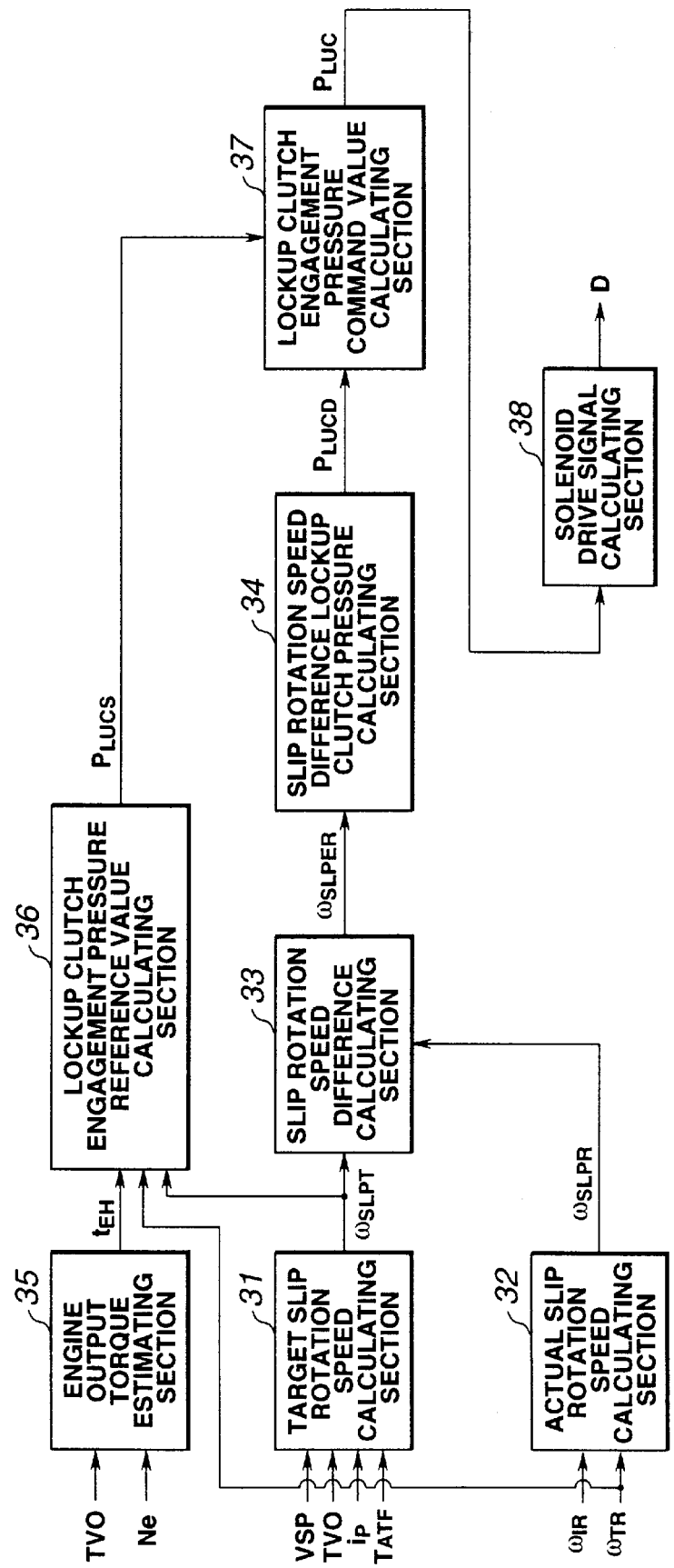
FIG. 4 is a block diagram showing the slip control executed by a controller of the slip control system according to the present invention.

The controller 12 determines a drive duty ratio D of the lockup solenoid 13 by executing the calculations according to a functional block diagram of FIG. 4 on the basis of the above-mentioned input signals, in order to execute a predetermined slip control.

At a target slip rotation speed calculating section 31, the controller 12 determines a target slip rotation speed $\omega_{SLPT}$ which is a smallest value within a range that no torque fluctuation and no noises are generated, on the basis of the vehicle speed VSP, the throttle opening TVO, the transmission ratio $i_P$, and the fluid temperature $T_{ATF}$.

At an actual slip rotation speed calculating section 32, the controller 12 calculates an actual slip rotation speed $\omega_{SLPR}$ of the torque converter 2 by subtracting the detected rotation speed $\omega_{TR}$ of the turbine runner 2b from the detected rotation speed $\omega_{IR}$ of the pump impeller 2a as follows:

$$\omega_{SLPR}=\omega_{IR}-\omega_{TR} \quad (1)$$

At a slip rotation speed difference calculating section 33, the controller 12 calculates the slip rotation speed difference $\omega_{SLPER}$ between the target slip rotation speed $\omega_{SLPT}$ and the actual slip rotation speed $\omega_{SLPR}$ using the following equation (2).

$$\omega_{SLPER}(t)=\omega_{SLPT}(t)-\omega_{SLPR}(t). \quad (2)$$

At a slip rotation speed difference lockup clutch pressure calculating section 34, the controller 12 calculates a slip rotation speed difference lockup clutch engagement pressure $P_{LUCD}$, which is a change amount of the lockup clutch engagement pressure necessary to adjust the actual rotation speed $\omega_{SLPR}$ to the target slip rotation speed $\omega_{SLPT}$ by means of the PI control (Proportional plus Integral Control), from the following equation (3).

$$P_{LUCD}(t)=K_P\cdot\omega_{SLPER}(t)+(K_I/S)\cdot\omega_{SLPER}(t) \quad (3)$$

wherein $K_P$ is proportion control constant, $K_I$ is integral control constant, and S is differential operator.

Figure 5:
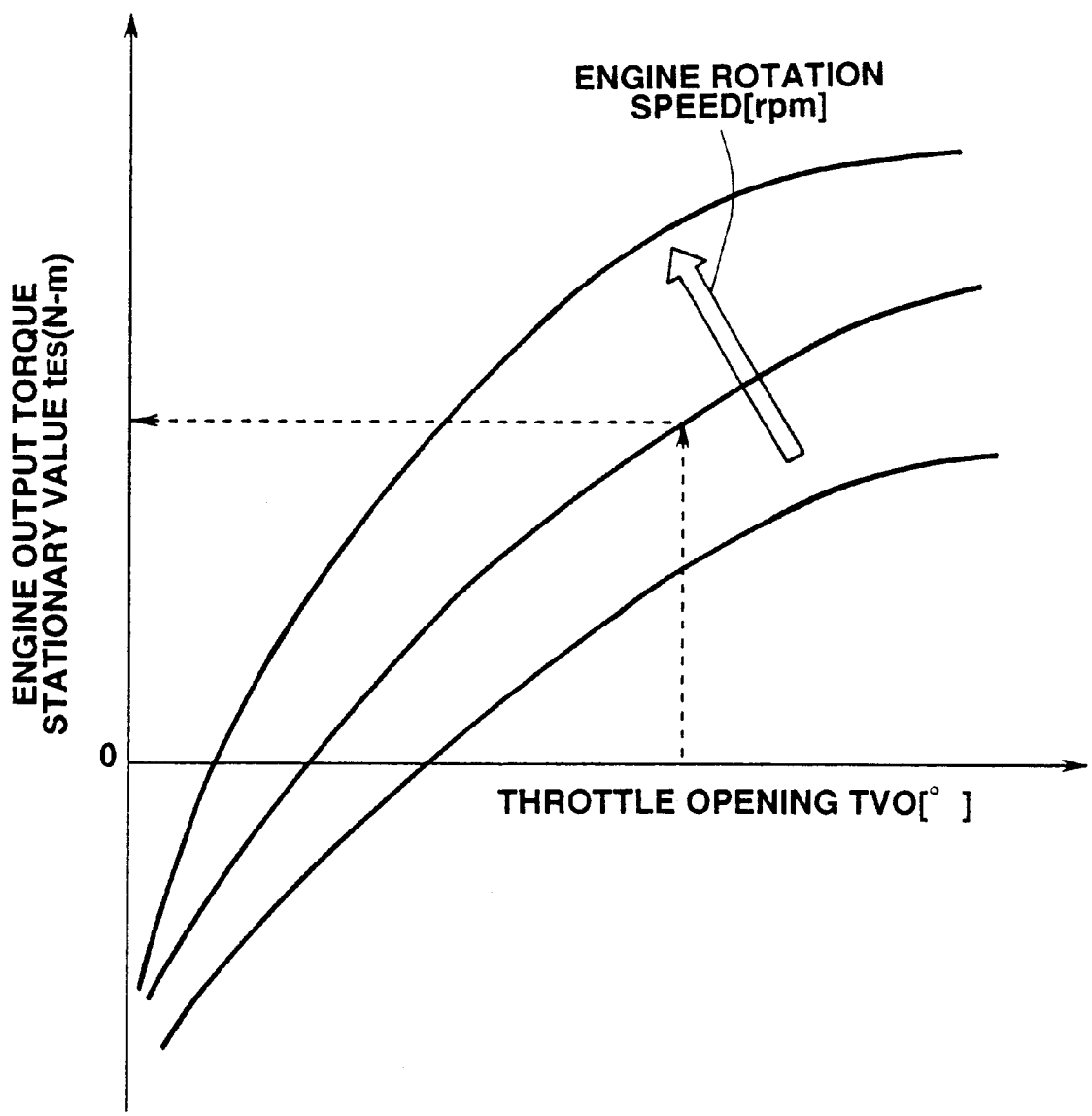
FIG. 5 is a graph which shows a relationship among a throttle opening, an engine rotation speed and an engine output torque.

At an engine output torque estimating section 35, the controller 12 retrieves a stationary value $t_{ES}$ of the engine output torque from mapped data corresponding to the graph of FIG. 5 according to the engine rotation speed $N_e$ and the throttle opening TVO. Further, at the engine output torque estimating section 35, the controller 12 processes the obtained stationary value $t_{ES}$ by flowing it through a filter having a time constant $T_{ED}$ corresponding to a dynamic engine delay in order to obtain a further accurate estimated value $t_{EH}$ so as to further finely approach the estimated value to the actual engine output torque. Such a filtering process is executed by the calculation of the following equation.

$$t_{EH}(t)=[1/(T_{ED}\cdot S+1)]t_{ES}(t) \quad (4)$$

At a lockup clutch engagement pressure reference value calculating section 36, the controller 12 calculates a lockup clutch engagement pressure reference value $P_{LUCS}$ for achieving the target slip rotation speed $\omega_{SLPT}$ under a present condition of the present engine output torque $t_{EH}$ and the present turbine runner rotation speed $\omega_{TR}$, by executing the following processes on the basis of the engine output torque $t_{EH}$ and the turbine runner rotation speed $\omega_{TR}$.

Figure 6:
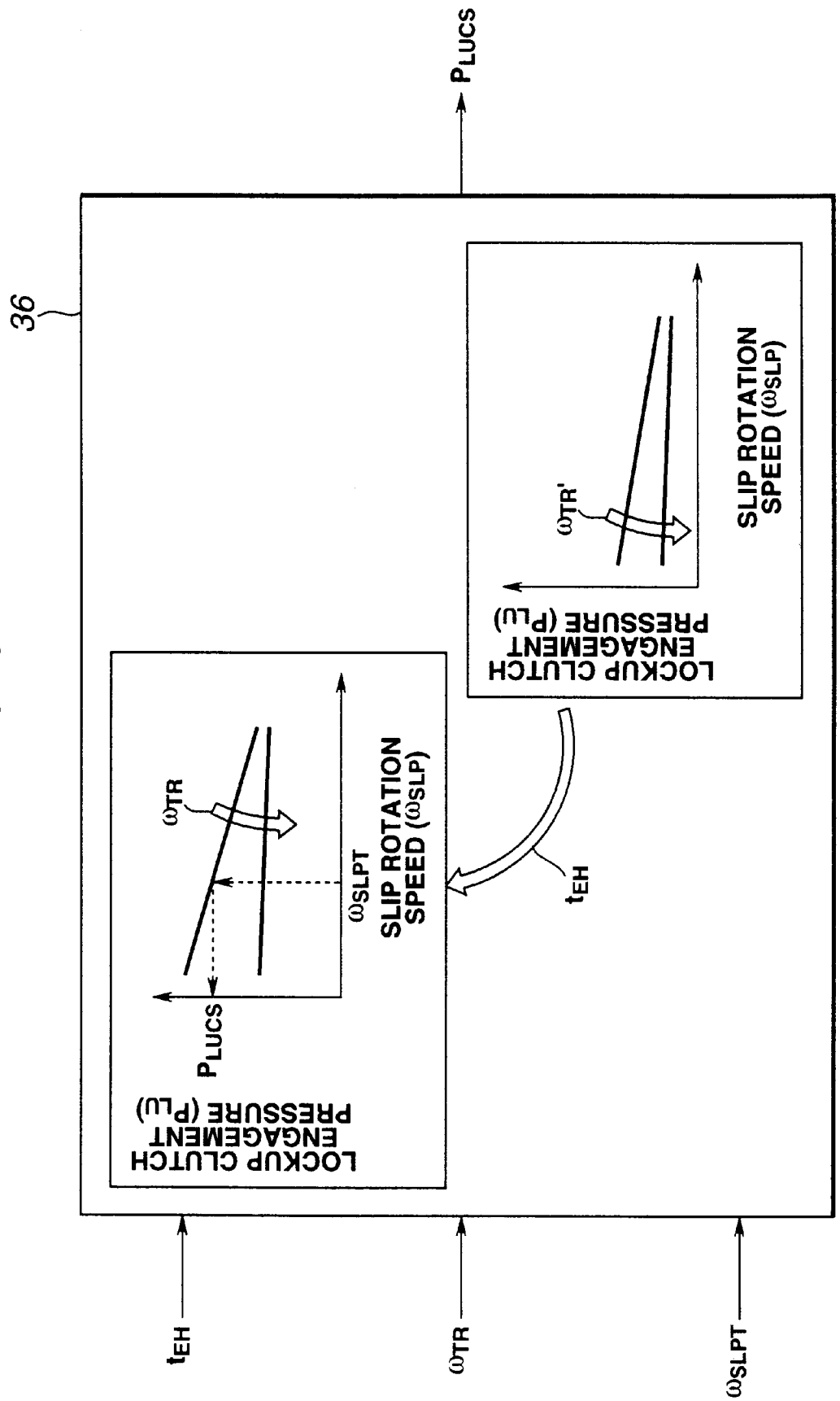
FIG. 6 is a detailed explanatory view of a lockup clutch engagement pressure reference value calculating section of the embodiment of FIG. 4 according to the present invention.

As shown in FIG. 6, data indicative of the relationship among the turbine runner rotation speed $\omega_{TR}$, the slip rotation speed $\omega_{SLP}$ and the lockup clutch engagement pressure $P_{LU}$ has been previously obtained by each the engine output torque $t_{EH}$ by means of experiments as to the engine performance.

A graph shown at a left and upper portion of FIG. 6 represents a relationship in a case that the engine output torque is set at maximum. The lockup clutch engagement pressure reference value $P_{LUCS}$ is obtained by substituting the target slip rotation speed $\omega_{SLPT}$ for the slip rotation speed $\omega_{SLP}$. This obtained reference value $P_{LUCS}$ of the lockup clutch engagement pressure rightly represents the lockup clutch engagement pressure for achieving the target slip rotation speed $\omega_{SLPT}$ under the condition of the present engine output torque $t_{EH}$ and the present turbine runner rotation speed $\omega_{TR}$. With this determining method of the lockup clutch engagement pressure reference value $P_{LUCS}$, it becomes easy to obtain the reference value $P_{LUCS}$ by retrieving the data indicative of the above-mentioned relationship.

Further, it will be understood that the following method may be employed instead of the above-mentioned method. As mentioned above, since the sum of the converter torque $t_{CNV}$ and the lockup clutch engagement capacity $t_{LU}$ equals to the engine output torque $t_{EH}$, the lockup clutch engagement capacity $t_{LU}$ is obtained by subtracting the converter torque $t_{CNV}$ from the engine output torque $t_{EH}$.

The inventors of the present invention found by research that the converter torque could be previously obtained as a relationship between the slip rotation speed and the turbine rotation speed by each torque converter from the torque converter power transmission performance. On the basis of this research, the inventors propose a new slip control system of a torque converter which system enables the calculation of the lockup clutch engagement pressure reference value $P_{LUCS}$.

Hereinafter the relationship among the converter torque $t_{CNV}$, the slip rotation speed $\omega_{SLPT}$ and the turbine rotation speed $\omega_T$ which are obtained from the power-transmission performance of the torque converter 2 will be discussed.

Figure 7:
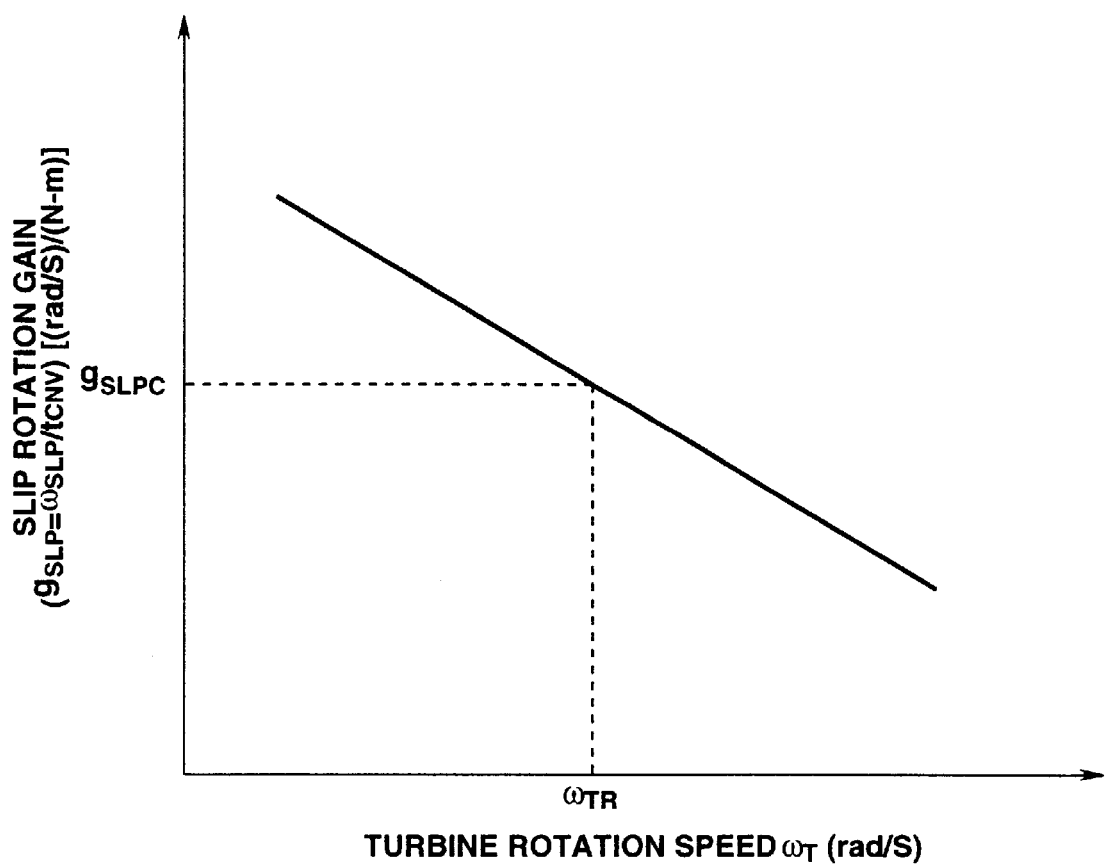
FIG. 7 is a graph which shows a relationship between a turbine rotation speed and a slip rotation speed gain of a torque converter.

When it was defined that a slip rotation speed gain $g_{SLP}$ was a ratio of the slip rotation speed $\omega_{SLP}$ with respect to the converter torque $t_{CNV}$ as shown in FIG. 7 and as follows:

$$g_{SLP}=\omega_{SLP}/t_{CNV} \quad (5)$$

it was confirmed that the slip rotation speed gain $g_{SLP}$ changed according to the turbine rotation speed $\omega_{SLP}$ as shown in FIG. 7. The slip rotation speed gain $g_{SLP}$ may be set constant regardless of the turbine rotation speed $\omega_{SLP}$ by each torque converter.

Therefore, at the lockup engagement pressure reference value calculating section 36 of FIG. 4, the controller 12 first obtains the slip rotation speed gain $g_{SLP}$ by retrieving the data corresponding to the map of FIG. 7 according to the turbine rotation speed detection value $\omega_{TR}$. In this process, it is preferable to employ a value $g_{SLPF}(t)$ which is obtained by passing the slip rotation speed gain $g_{SLPC}$ through a low pass filter having a first order lag time constant $T_{SLP}$, in order to suppress the influence due to a high frequency and a radical change of the gain $g_{SLPC}$. The filtered value $g_{SLPF}(t)$ is obtained by the following equation (6).

$$g_{SLPF}(t)=[1/(T_{SLP}\cdot S+1)]g_{SLPC}(t) \quad (6)$$

This filter treated value $g_{SLPF}(t)$ stabilizes the slip control by eliminating the influence due to a high frequency and a radical change of the gain $g_{SLPC}$.

Further, at the lockup clutch engagement pressure reference value calculating section 36, the controller 12 calculates a target converter torque $t_{CNVC}$ by replacing $g_{SLP}$ with $g_{SLPF}$ and $\omega_{SLP}$ with a slip rotation speed command value $\omega_{SLPC}$ from the calculating section 34 in the equation (5) as shown in the following equation (7). The target converter torque $t_{CNVC}$ is a target value for achieving the slip rotation speed command value $\omega_{SLPC}$ when the turbine rotation speed is $\omega_{TR}$.

$$t_{CNVC}(t)=\omega_{SLPC}(t)/g_{SLPF} \quad (7)$$

Next, a target lockup clutch engagement capacity $t_{LUC}$ is obtained by subtracting the target converter torque $t_{CNVC}$ from the estimated engine output torque $t_{EH}$ as follows:

$$t_{LUC}(t)=t_{EH}(t)-t_{CNVC}(t) \quad (8)$$

Figure 8:
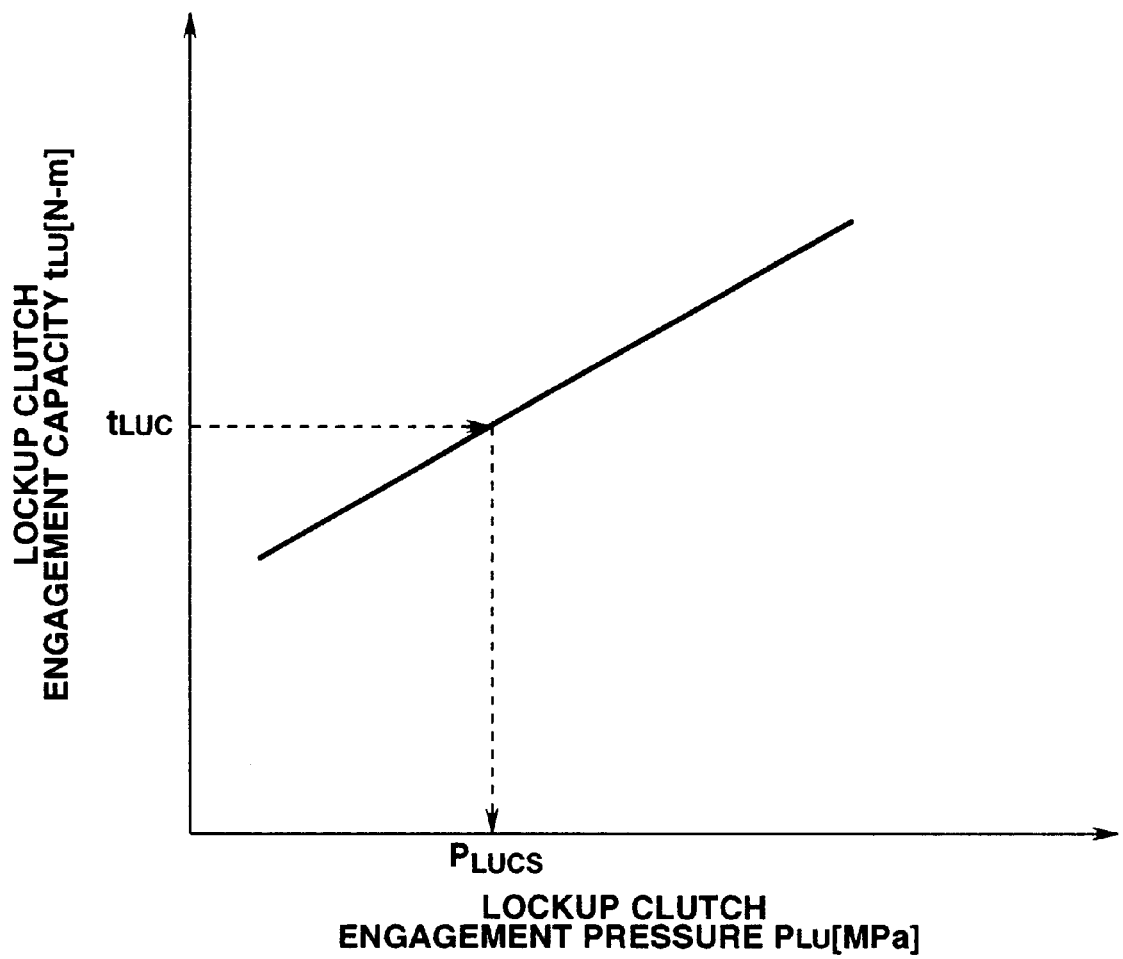
FIG. 8 is a graph which shows a relationship between the engagement pressure and an engagement capacity of the lockup clutch.

Further, the controller 12 retrieves the lockup clutch engagement pressure reference value $P_{LUCS}$ for achieving the target slip rotation speed $\omega_{SLPT}$ under the present engine output torque $t_{EH}$ and the present turbine rotation speed $\omega_{SLPT}$ from the data corresponding to the map of FIG. 8, as exemplified in FIG. 8.

The relationship between the lockup clutch engagement pressure $P_{LU}$ and the lockup clutch engagement capacity $t_{LU}$ shown in FIG. 8 was previously obtained by each torque converter through experiments. Therefore, it is possible to adjust the slip rotation speed at the target value by using the retrieved value of the lockup clutch engagement pressure corresponding to the target lockup clutch engagement capacity $t_{LUC}$ as the lockup clutch engagement pressure reference value $P_{LUCS}$.

In case that the lockup clutch engagement pressure reference value $P_{LUCS}$ is obtained by using the concept of the slip rotation speed gain, the slip control system functions to further accurately derive the lockup clutch engagement pressure $P_{LUCS}$.

At the lockup clutch engagement pressure command value calculating section 37, the controller 12 uses the sum of the slip rotation speed difference lockup clutch engagement pressure $P_{LUCD}$ and the lockup clutch engagement pressure reference value $P_{LUCS}$ obtained by one of the above-mentioned methods, as the lockup clutch engagement pressure command value $P_{LUC}$.

At a solenoid drive signal calculating section 38, the controller 12 determines a lockup solenoid drive duty D for setting the actual lockup clutch engagement pressure at the lockup clutch engagement pressure command value $P_{LUC}$ and outputs the determined lockup solenoid drive duty D to the lockup solenoid 13 shown in FIGS. 1 and 2.

Figure 9A:
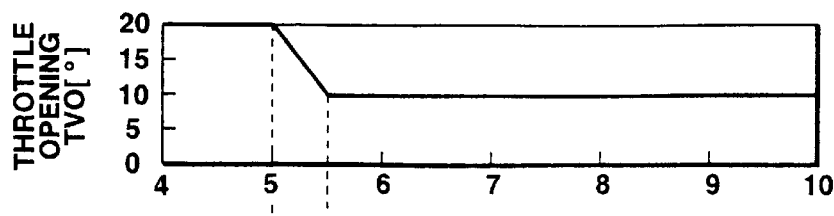
FIGS. 9A to 9E are time charts which show an operation ensured by the slip control according to the present invention.
Figure 9B:
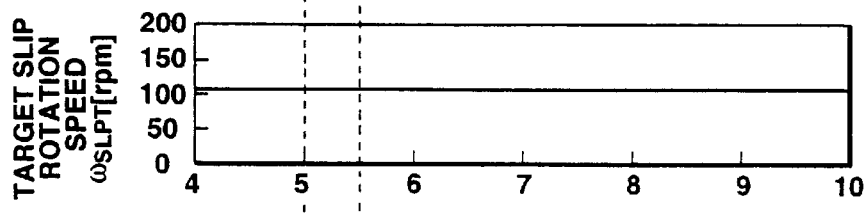
Figure 9C:
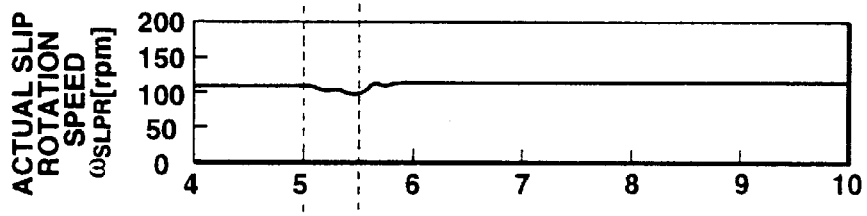
Figure 9D:
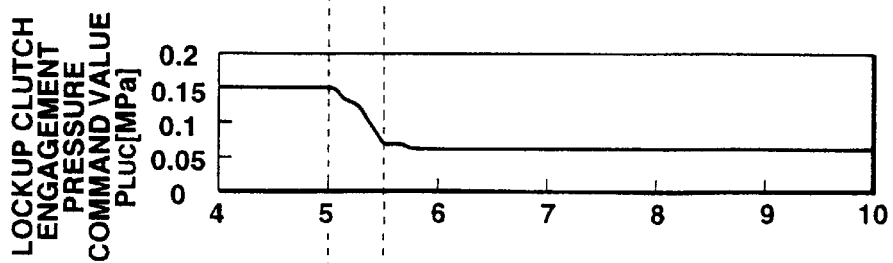
Figure 9E:
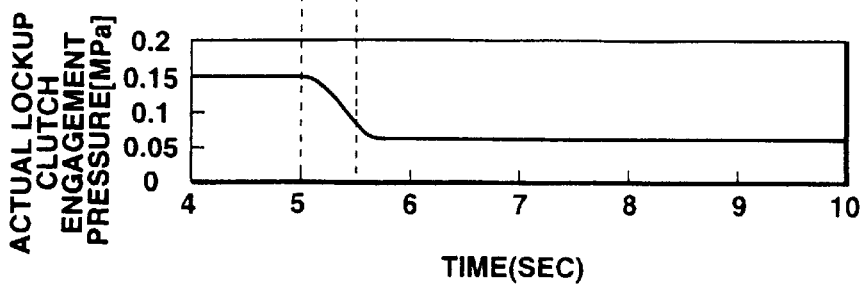
Figure 10A:
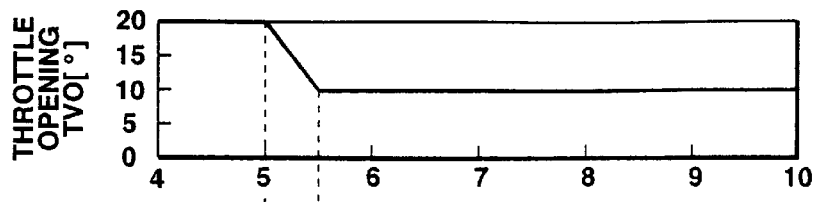
FIGS. 10A to 10E are time charts which show an conventional operation ensured by a convention slip control.
Figure 10B:
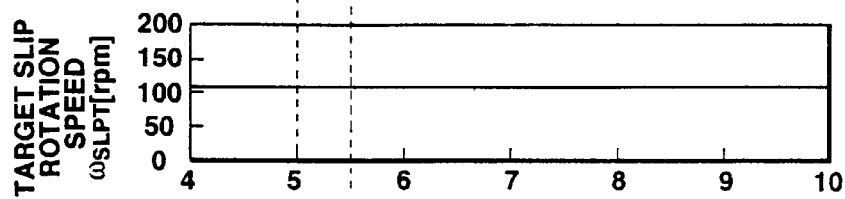
Figure 10C:
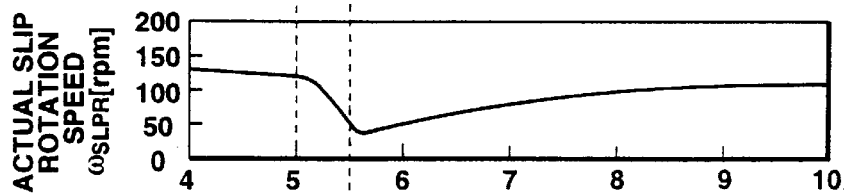
Figure 10D:
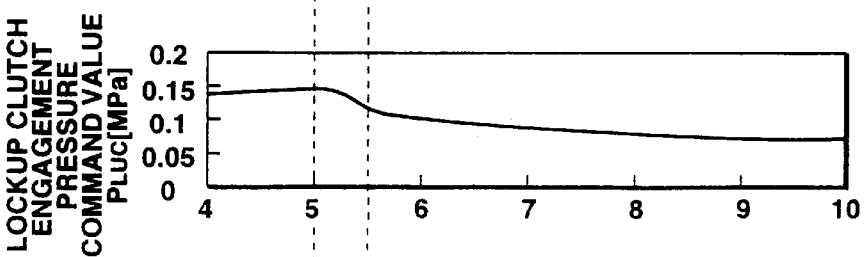
Figure 10E:
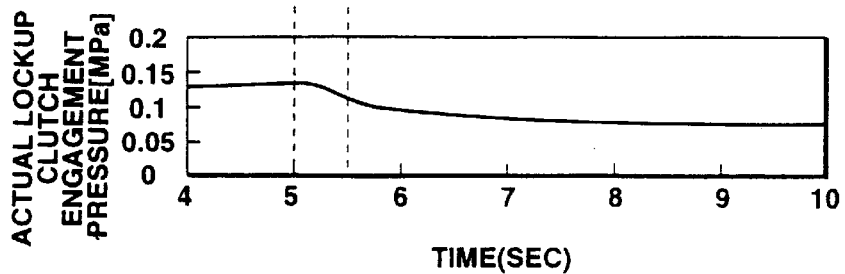

With the thus arranged duty control of the lockup solenoid 13, it is possible to control the slip rotation speed $\omega_{SLP}$ at the target slip rotation speed $\omega_{SLPT}$. Since the lockup clutch engagement pressure command value $P_{LUC}$ is determined by the sum of the lockup clutch engagement pressure reference value $P_{LUCS}$ and the slip rotation speed difference lockup clutch engagement pressure $P_{LUCD}$ and since the lockup clutch engagement pressure reference value PLUCS corresponds to the engine output torque $t_{EH}$, the slip control according to the present invention is executed upon taking account of the engine output torque $t_{EH}$. Accordingly, the slip control according to the present invention ensures the following functional advantages:

That is, in case that the throttle opening TVO is decreased from 20° to 10° during when the vehicle is running at the 45 km/h to keep the target slip rotation speed $\omega_{SLPT}$ at 110 rpm as shown in FIGS. 9A to 9E, the lockup clutch engagement pressure command value $P_{LUC}$ is firmly decreased with no delay with respect to the decrease of the throttle opening TVO as shown in FIG. 9B. This prevents the problem that the actual lockup clutch engagement pressure is kept at a high value after the decrease of the throttle opening.

Accordingly, the actual slip rotation speed $\omega_{SLPR}$ generally follows the target rotation speed $\omega_{SLPT}$ as shown in FIG. 8C while avoiding the actual slip rotation speed $\omega_{SLPR}$ becomes too small as compared with the target slip rotation speed $\omega_{SLPT}$. Therefore, the slip control according to the present invention prevents the noises in the torque converter from being generated by a temporal shortage of the slip rotation speed of the torque converter 2.

Since the calculating section 36 is arranged to obtain the lockup clutch engagement pressure reference value $P_{LUCS}$ and to employ the slip rotation speed gain $g_{SLPF}$ which is obtained by flowing the slip rotation speed gain $g_{SLP}$ by the low pass filter, the filtered slip rotation speed gain $g_{SLPF}$ avoids a radical change so as to prevent the degradation of the slip control even if the retrieved gain is radically or frequently changed.

Since the engine output torque estimating section 35 is arranged to estimate the engine output torque $t_{ES}$ on the basis of the map showing the relationship among the throttle opening TVO, the engine rotation speed $N_e$ and the output torque $t_{ES}$ as shown in FIG. 6 and from the throttle opening TVO and the engine rotation speed $N_e$, the target lockup clutch engagement capacity $t_{LUC}$ is corrected on the basis of the engine output torque. Therefore, the slip control is further finely executed.

Since the engine output torque estimating section 35 is arranged to filter the estimated engine output torque by means of the filter corresponding to the dynamic delay of the engine 1 lo and to output the estimated and filtered engine output torque, the estimation of the engine output torque is executed upon taking account of the dynamic delay of the engine 1. Therefore, the slip control is further finely executed.

The contents of Application No. 9-244989, with a filing date of Sep. 19, 1997 in Japan, are hereby incorporated by reference.

What is claimed is:

1. A slip control system for a torque converter with a lockup clutch, the slip control system controlling a slip rotation speed between a pump impeller and a turbine runner of the torque converter at a target slip rotation speed by controlling an engagement pressure of the lockup clutch, the pump impeller being connected to an engine to receive an engine output torque, the slip control system comprising:

a vehicle condition detector that detects an operation condition of a vehicle equipped with the torque converter and the engine;

an engine output torque determining section that determines the engine output torque on the basis of signals output from said vehicle condition detector;

a turbine runner rotation speed detector that detects a rotation speed of the turbine runner;

a reference value calculating section that calculates a reference value of the lockup clutch engagement pressure on the basis of the engine output torque as determined by the engine output torque determining section, the target slip rotation speed, and the rotation speed of the turbine runner as detected by the turbine runner rotation speed detector;

a slip rotation speed difference lockup clutch engagement pressure calculating section that calculates a slip rotation speed difference lockup clutch engagement pressure which is a change amount of the lockup clutch engagement pressure to adjust an actual slip rotation speed to the target slip rotation speed; and a lockup clutch engagement pressure command value calculating section that obtains the sum of the lockup clutch engagement pressure reference value and the slip rotation speed difference lockup clutch engagement pressure as a lockup clutch engagement pressure command value and that outputs a signal indicative of the lockup clutch engagement pressure command value.

2. A slip control system as claimed in claim 1, further comprising a data storing section for storing data indicative of a characteristic among the lockup clutch engagement pressure reference value, the target slip rotation speed, the engine output torque and the turbine runner rotation speed, the reference value calculating section calculating the reference value of the lockup clutch engagement pressure on the basis of the data stored in the data storing section.

3. A slip control system as claimed in claim 2, wherein the data indicative of the characteristic of the torque converter is previously stored in the form of a slip rotation speed gain which is a ratio of the slip rotation speed to a converter torque, a target converter torque being obtained by dividing the target slip rotation speed by the slip rotation speed gain, a target lockup clutch engagement capacity being obtained by subtracting the target converter torque from the engine output torque, a lockup clutch engagement force corresponding to the target lockup clutch engagement capacity being defined as the lockup clutch engagement pressure reference value.

4. A slip control system as claimed in claim 3, wherein the retrieved slip rotation speed gain is treated by a low-pass filter, the target converter torque being calculated by using the filtered slip rotation speed gain.

5. A slip control system as claimed in claim 1, wherein a relationship among a drive load, a rotation speed and the engine output torque of the engine is previously obtained, the engine output torque being estimated from the relationship of the engine, an actual drive load and an actual rotation speed of the engine, the estimated engine output torque being used to calculate the lockup clutch engagement pressure reference value.

6. A slip control system as claimed in claim 5, wherein the engine output torque is treated by a filter corresponding to a dynamic delay of the engine, the target lockup clutch engagement pressure reference value being calculated by using the filtered engine output torque.

7. A slip control system or a torque converter with a lockup clutch, the torque converter having an input element connected to an engine, an output element connected to an automatic transmission and a lockup clutch, said slip control system comprising:

a throttle opening sensor detecting a throttle opening of the engine;

an engine rotation speed sensor detecting a rotation speed of the engine;

a converter input element rotation speed detector detecting a rotation speed of the input element of the torque converter;

a converter output element rotation speed detector detecting a rotation speed of the output element of the torque converter;

an actuator controlling a lockup clutch engagement pressure of the lockup clutch according to a control signal; and a controller storing data indicative of a relationship among, a lockup clutch engagement pressure reference value, a target slip rotation speed, an engine output torque and a rotation speed of the converter input element as to the torque converter, said controller being arranged to obtain the lockup clutch engagement pressure reference value on the basis of an estimated engine output torque, a determined target slip rotation speed, the rotation speed of the torque converter input element and the data indicative of the relationship of the torque converter, to calculate a slip rotation speed difference lockup clutch engagement pressure for adjusting an actual slip rotation speed with the target slip rotation speed, to obtain a lockup clutch engagement pressure command value by summing the lockup clutch engagement pressure reference value and the slip rotation speed difference lockup clutch engagement pressure, and to output a signal indicative of the lockup clutch engagement pressure command value to said actuator.

8. A slip control system for a torque converter with a lockup clutch, the torque converter being connected to an engine and having a relationship between a converter torque and a slip rotation speed, the slip control system comprising:

a vehicle condition detector detecting operation condition of a vehicle equipped with the torque converter and the engine;

an engine output torque estimating section estimating an engine output torque on the basis of signals from said vehicle condition detector;

a target slip rotation speed calculating section determining a target slip rotation speed which is a smallest value within a range that no torque fluctuation and no noises are generated, on the basis of the signal from said vehicle condition detector;

a lockup clutch engagement pressure reference value calculating section calculating a lockup clutch engagement pressure reference value for achieving the target slip rotation speed under a present vehicle condition on the basis of the signal of said vehicle condition detector, the estimated engine output torque, the target slip rotation speed and a previously obtained relationship among the lockup clutch engagement pressure reference value, the target slip rotation speed, the engine output torque and a rotation speed of an output element of the torque converter;

an actual slip rotation speed calculating section calculating an actual slip rotation speed of the torque converter on the basis of the signals from said vehicle condition detector;

a slip rotation speed difference calculating section calculating the slip rotation speed difference between the target slip rotation speed and the actual slip rotation speed;

a slip rotation speed difference lockup clutch engagement pressure calculating section calculating a slip rotation speed lockup clutch engagement pressure for adjusting the actual rotation speed at the target slip rotation speed;

a lockup clutch engagement pressure command value calculating section obtaining the sum of the lockup clutch engagement pressure reference value and the slip rotation speed difference lockup clutch engagement pressure as the lockup clutch engagement pressure command value; and a solenoid drive signal calculating section determining a lockup solenoid drive duty for setting the actual lockup clutch engagement pressure at the lockup clutch engagement pressure command value and outputting the determined lockup solenoid drive duty.

9. A slip control system as claimed in claim 8, wherein said vehicle condition detector includes a throttle opening sensor, an engine rotation speed sensor, a vehicle speed sensor, a converter oil temperature sensor, a converter input element rotation speed sensor and a converter output element rotation speed sensor.

10. A slip control system as claimed in claim 8, wherein said slip rotation speed difference lockup clutch pressure calculating section calculates the slip rotation speed difference lockup clutch engagement pressure $P_{LUCD}$, which is a change amount of the lockup clutch engagement pressure necessary to adjust the actual rotation speed $\omega_{SLPR}$ to the target slip rotation speed $\omega_{SLPT}$ from the following equation:

$$P_{LUCD}(t) = K_P \cdot \omega_{SLPER}(t) + (K_I/S) \cdot \omega_{SLPER}(t)$$

wherein $K_P$ is proportion control constant, $K_I$ is integral control constant, S is differential operator, $\omega_{SLPR}$ is the actual rotation speed, and $\omega_{SLPT}$ is the target slip rotation speed.

11. A slip control system as claimed in claim 8, wherein said engine output torque estimating section processes a stationary engine output torque tES by flowing it through a filter, having a time constant TED corresponding to a dynamic engine delay to obtain the estimated engine output torque tEH the from the following equation:

$$t_{EH}(t) = \{1/(T_{ED} \cdot S + 1)\} t_{ES}(t)$$

wherein S is differential operator.

* * * * *